United States Patent [19]

Kromrey

[11] Patent Number: 4,879,073
[45] Date of Patent: Nov. 7, 1989

[54] PROCESS OF HIGH PRESSURE CURING WITH ULTRAVIOLET RADIATION

[75] Inventor: Robert V. Kromrey, Campbell, Calif.

[73] Assignee: United Technologies Corporation, Hartford, Conn.

[21] Appl. No.: 184,929

[22] Filed: Apr. 22, 1988

[51] Int. Cl.⁴ .................... B29C 35/08; B29C 35/10; B29C 43/10; B29C 43/22

[52] U.S. Cl. ................................... 264/22; 264/137; 264/171; 264/236; 264/257; 264/313; 264/320; 425/174; 425/405.2; 425/DIG. 19

[58] Field of Search ................ 264/22, 137, 171, 236, 264/257, 313, 320, 347, 500, 510, 555, 570; 425/174, 405.2, DIG. 19

[56] References Cited

U.S. PATENT DOCUMENTS

| | | | |
|---|---|---|---|
| 3,843,601 | 10/1974 | Bruner | 528/24 |
| 3,850,722 | 11/1974 | Kreft | 156/172 |
| 4,011,929 | 3/1977 | Jeram et al. | 188/268 |
| 4,166,088 | 8/1979 | Neefe | 264/22 X |
| 4,478,771 | 10/1984 | Schreiber | 264/22 |
| 4,637,904 | 1/1987 | Rounds | 264/22 X |
| 4,686,271 | 8/1987 | Beck et al. | 528/15 |
| 4,704,240 | 11/1987 | Reavely et al. | 264/257 X |
| 4,755,341 | 7/1988 | Reavely et al. | 264/257 X |
| 4,772,437 | 9/1988 | Reavely et al. | 264/22 |

FOREIGN PATENT DOCUMENTS

| | | |
|---|---|---|
| 233134 | 8/1987 | European Pat. Off. . |
| 2134168 | 1/1973 | Fed. Rep. of Germany ...... 264/320 |
| 53-80477 | 7/1978 | Japan ................................. 264/22 |
| 56-89921 | 7/1981 | Japan ................................. 264/22 |
| 57-142317 | 9/1982 | Japan ................................. 264/22 |
| 59-70508 | 4/1984 | Japan ................................. 264/22 |
| 59-109311 | 6/1984 | Japan ................................. 264/22 |
| 59-123635 | 7/1984 | Japan ................................. 264/22 |
| 61-69413 | 4/1986 | Japan ................................. 264/22 |
| 62-174134 | 7/1987 | Japan ................................. 264/22 |
| 63-5931 | 1/1988 | Japan ................................. 264/22 |
| 1402733 | 8/1975 | United Kingdom ................ 264/22 |
| 1546764 | 5/1979 | United Kingdom ................ 264/22 |

OTHER PUBLICATIONS

Beck, E. W., "Silicone Rubber puts on Squeeze for High Quality Composite Layups", *Plastics World*, Jun. 16, 1975, pp. 45–47.

*Primary Examiner*—Jeffery Thurlow
*Assistant Examiner*—Leo B. Tentoni

[57] ABSTRACT

A method of molding a polymeric containing article by exposing the article to ultraviolet radiation and a substantially uniform pressure. The method includes placing the precursor article within a pressure vessel and substantially filling the vessel with a solid, flowable, polymer medium that is substantially ultraviolet transparent under pressure. The polymer medium is pressurized so as to produce a substantially, uniform predetermined pressure on the surface of the article and the article is exposed to ultraviolet radiation that passes through the polymer medium to cure the article. Alternatively, the polymeric article may be passed through the medium containing vessel during exposure to ultraviolet radiation and a substantially uniform pressure.

9 Claims, 2 Drawing Sheets

PROCESS OF HIGH PRESSURE CURING WITH ULTRAVIOLET RADIATION

TECHNICAL FIELD

The present invention relates to methods of molding polymeric containing articles with ultraviolet light under pressure.

BACKGROUND ART

There are a variety of methods of molding articles. These include autoclaves, hydroclaves and compression molding. Particularly for high temperature molding (e.g., polyimide resins) one isostatic molding process has shown great advantage over other methods. This method is described in commonly assigned European Patent Application No. 87630010.4 entitled "Molding Method and Apparatus Using a Solid, Flowable, Polymer Medium" to Kromrey. An article is molded by contacting it with a solid polymer medium, such as an especially low strength unfilled silicone rubber which is solid and able to flow readily. One characteristic of such a silicone material is that it tends to coalesce under pressure so that the interfacial boundaries between the particles are so essentially conformed that the compressed rubber becomes translucent instead of opaque. (E.P.A. No. 87630010.4, Col. 10, lines 55-62) Thermal expansion of the medium or mechanical force is used to create molding pressure and thereby provides a substantially uniform pressure on the article precursor. Various temperature and pressure cycles can be attained; constant high pressures can be maintained on the article precursor during cooldown, optionally aided by flowing of medium to and from a vessel in which the article precursor is being molded. The method is particularly adapted to molding filler or fiber reinforced thermosetting polymer composite articles.

Typically, the above process cures composites or plastics over short periods of time. However, application of heat for rapid curing is often impractical or impossible. The higher temperatures typically needed for snap cures can cause severe warpage in laminates and can result in exotherms that can degrade polymers. An alternative to thermal curing is ultraviolet (UV) radiation curing. Although there can be a slight exotherm with a UV cure, the small exotherm can be controlled. Even in-depth UV curing does not result in the large thermal gradients that can develop with heat cures.

Recent advances in formulating UV curing polymers have resulted in high performance resin matrices for rapid curing composites. These polymeric materials must have adequate optical transparency required for in-depth curing. The optical transparency constraint also precludes the use of opaque tooling including some conventional vacuum bag materials, particularly for thick structures.

Accordingly, there is a constant search for UV composite curing processes.

DISCLOSURE OF INVENTION

This invention is directed to a method of molding a polymeric containing article comprising exposing the article to ultraviolet radiation and a substantially uniform pressure. The method comprises placing the precursor article within a pressure vessel and substantially filling the vessel with a solid, flowable, polymer medium that is substantially ultraviolet transparent under pressure. The polymer medium is pressurized so as to produce a substantially, uniform predetermined pressure on the surface of the article and the article is exposed to ultraviolet radiation that passes through the polymer medium to cure the article.

Another aspect of this invention is directed to a method of molding a polymeric containing article, comprising transferring a polymeric containing article through a vessel and exposing the article to a substantially uniform pressure and ultraviolet radiation. The method comprises substantially filling a pressure vessel with a solid flowable polymer medium that is substantially ultraviolet transparent under pressure. The polymer medium is pressurized so that said medium is capable of producing a substantially uniform, predetermined pressure on the surface of the article to be molded. The article precursor is transferred through the pressurized vessel while passing ultraviolet radiation through the polymer medium sufficient to cure said article precursor.

The foregoing and other objects, features and advantages will be apparent from the specification, claims and from the accompanying drawings which will illustrate an embodiment of the invention.

BEST MODE FOR CARRYING OUT THE INVENTION

Figure 1:
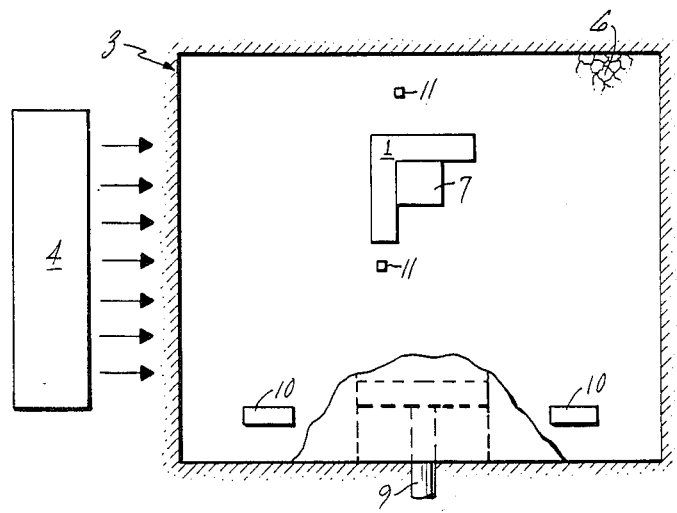
FIG. 1 shows schematically an apparatus for performing a method of the present invention by controlling the pressure on an article to be molded while subjecting it to UV radiation.

FIG. 1 demonstrates schematically a method and apparatus according to the present invention wherein a polymer containing article precursor 1 (e.g., composite prepreg) is placed in a pressure vessel 3 (UV transparent (e.g. acrylic) where the vessel is between the radiation source 4 and the article precursor 1). Polymer medium 6 (ultraviolet transparent under pressure) is disposed between the article 1 and the radiation source 4. The polymer medium 6 may be in contact with more or less of the article precursor 1 as is desired. Typically, the surface area of the article precursor not in contact with the polymer medium is disposed (e.g., in contact) next to a tool 7 in order to provide (or maintain) a particular shape to the article. A pressurizer 9 (e.g., piston) applies the requisite, uniformly distributed medium pressure to the article precursor. However, the article is preferably pressurized via the thermal expansion of the polymer medium via heating elements 10. Such things as conventional pressure transducers 11 can be inserted in various places within the pressure vessel 3 to detect the requisite pressure. While any pressure can be used with the present invention, typically pressures up to 3000 pounds per square inch (psi) are required for molding such things as composite materials. The radiation source 4 provides UV radiation sufficient (described hereinafter) to cure the polymeric containing article.

Figure 2:
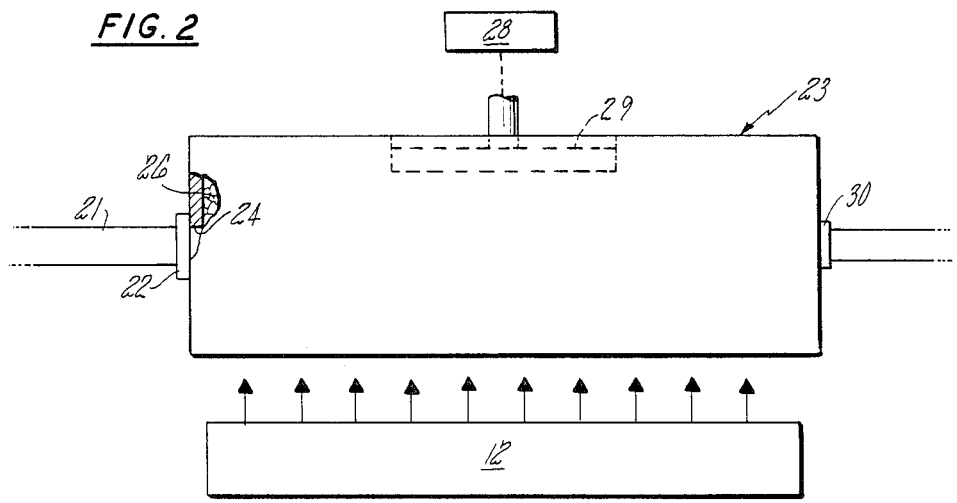
FIG. 2 shows schematically an apparatus for performing another method of the present invention wherein an article is exposed to pressure and UV radiation as it is transferred through a pressure vessel.

In FIG. 2, the pressure vessel 23 (preferably UV transparent) is substantially filled with a polymer medium (that is UV transparent under pressure) 26. The pressure control apparatus 28 provides pressure through a pressurizer 29 (e.g., piston) to the polymer medium. Alternatively, the thermal expansion of the polymer medium can provide the pressure. The article precursor 21 is transferred through a bushing 22 (which contains the polymer medium within the pressure vessel when an article is not being molded) located in an orifice 24 in a pressure vessel 23. As the article precursor 21 is drawn through the pressure vessel 23, it is exposed to a medium pressure by the polymer medium 26. This pressure can be uniformly distributed or have a gradient where the pressure is staged. This is particularly applicable to resin systems that can exhibit excess flow under initial high pressures (e.g., can't withstand initial high pressures). In addition, a radiation source 12 provides UV radiation sufficient to cure the polymeric containing article. The article exits through bushing 30. Extremely long sections can be made when a continuous pulling force is maintained. The speed of curing can be fast enough to process structural sections at a high rate (e.g., 12 or more inches per second).

A preferred pressure causing/transferring solid flowable media is described in European Patent Application No. 87630020.4 entitled "Molding Method and Apparatus Using a Solid, Flowable, Polymer Medium" by Kromrey, the disclosure of which is hereby incorporated by reference and in commonly assigned U.S. application Ser. No. 829,048 now abandoned, Continuation Ser. No. 201,355 entitled "Molding Method and Apparatus Using a Solid Flowable, Polymer Medium", the disclosure of which is hereby incorporated by reference.

The medium's responsiveness to temperature and pressure coupled with its flowability and solid nature at molding temperatures enable it to be useful. These properties cause the medium to produce an advantageous, substantially uniform, controllable pressure on the surface of the article precursor to be molded. In a typical embodiment of the invention, the polymer is an unfilled silicone rubber particulate of $-4+30$ U.S. mesh sieve size (4.7–0.42 millimeter (mm)), which when pressurized, is sufficiently self-compliant to coalesce as an essentially void-free medium at a pressure of the order of 69 kPa (10 psi).

Typically, a silicone rubber is used as the pressurizing polymer. The preferred solid flowable polymer material is further described in U.S. Pat. No. 4,686,271 entitled "Hydraulic Silicone Crumb" by Beck et al, the disclosure f which is hereby incorporated by reference. The rubber is also an improvement on the type which is described in U.S. Pat. No. 3,843,601 to Bruner. See also U.S. Pat. No. 4,011,929 to Jeram et al. The disclosures of the above patents are hereby incorporated by reference. Generally, the preferred materials are dimethylsilicones that have vinyl groups. They may be produced by conventional commercial procedures, including production from polysiloxanes using various vulcanizing techniques. Preferred materials which have been used thus far are the experimental unfilled silicone rubber materials designated as X5-8017, formerly No. 6360 B1 (more simply 8017 hereinafter), X5-8023 and X5-8800 by the Dow Corning Corporation (Midland, Mich.).

Another Dow Corning silicone rubber, No. 93-104, without its ordinary fillers (called "93-104" herein, nonetheless) is useful. The Polygel C-1200 silicone rubber Stauffer Chemical Company, Westport, Conn. USA), believed to be essentially the material which is described in the Bruner U.S. Pat. No. 3,843,601 is also useful with the present invention.

Other preferred materials are the vinylmethylsiloxane-dimethylsiloxane (VMS-DMS) polymers such as Dow Corning No. X5-8026 as described in commonly assigned copending application Ser. No. 907,946 entitled "High Temperature Solid Flowable Polymer Medium and Method of Molding Using the Same", the disclosure of which is hereby incorporated by reference as it is usable at high temperatures, (e.g., 316° C. (600° F.) 482° C. (900° F.)).

Most silicone rubbers are temperature limited for long term use, e.g., typically up to about 232° C. (450° F.). However, silicone resins of the vinylmethylsiloxane and silphenylene types have been successfully tested up to about 482° C. (900° F.). Fillers and other adulterants (such as the metal particulates described below) can be included with and within the medium, provided the essential behavior properties are maintained.

The preferred 8023 silicone rubber is characterized by low strength and high friability. By "high friability" is meant there is such low strength that moderate size solids tend to disintegrate into smaller particulates when subjected to modest mechanical forces, even rubbing between the fingers. The 8017 material has a Shore A hardness of less than 1 (Shore 00 hardness of 50–55) and compressive strength of the order of 70 kPa when measured on a 2.5 cm square by 1.27 cm thick specimen, and upon a compression deformation of about 40%, it shears into smaller particles. This behavior is contrasted with that of more conventional rubbers which have higher strength, greater resistance to deformation and greater elongation to failure. It has also be observed that preferred polymer useful with the present invention forced through a small orifice, or through a 1.1 cm diameter pipe as described below, has a tendency to disintegrate into smaller particulate. By example, it is found that over time, a nominal 30 mesh size powder having about 50 weight percent retained on a 40 mesh screen will change to one having only about 25 weight percent retained on 40 mesh.

The aforementioned behavior of the polymer media enables the fabrication of intricately shaped composite polymer parts with uniform properties under the controlled and independent application of uniform pressure and temperature. In one embodiment of the invention, the polymer has a Shore A hardness of less than about 15, typically less than 8, and desirably less than 1; the compressive strength is less than 1 MPa, and desirably less than 0.2 MPa.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having downwardly movable piston to test the polymer portion of the medium. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32-64 RMS (root mean square) surface finish. The pipe length is chosen as desired, with 7.6 cm and 15.2 cm being preferred.

Thus, generally it can be said that the polymer will have flowability, i.e., mass transport can occur when molding pressures are applied. The preferred polymer, when tested in the apparatus described above using 10.3 MPa (1500 psi) and a 15.2 cm (6 inch) pipe, has a flow rate of at least 0.6 g/s, typically 6 g/s, and desirably more than 25 g/s.

Further description of the polymer is given below. A particulate elastomer is typically used in the practice of the invention. When the 8017 polymer is used as particulate solids, prior to the application of pressure the particulates are spaced apart at the article precursor surface. But when pressure is applied, the particles self-comply and coalesce into a continuous void-free body. Because of this and their inherent resilience, a uniform hydraulic-like pressure is applied to the article precursor surface. Tests show that the 6360 material will tend to coalesce upon the application of moderate compressive pressure, of the order of 70 kPa; at this point the interfacial boundaries between the particles are so essentially conformed that the compressed rubber becomes translucent instead of opaque. The 8017 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except absorbed gas) contained in the interstices between the particulates.

Thus, the preferred material, when used in particulate form, will be self-compliant and will tend to coalesce as an apparent void-free body below a pressure of 350 kPa, preferably 240 kPa; more preferably about 69 kPa.

Based on various molding tests and material property measurement, desirable results have been associated with medium having low strength, the ability to self-comply under molding level pressures, and the ability to flow and exhibit hydraulic-like behavior. Other silicone rubbers than 8017 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

Tests run on the granular 8017 material showed a maximum variation in pressure of as low as 2% at about 6.9 MPa nominal pressure; other useful materials produced pressure uniform within 10%. Addition of molten metal matrices does not adversely affect the above-cited property.

The usefulness of the materials is also evaluated according to the integrity of a molded finished product, it being well established that inspection will commonly show areas of low density or cracking where the proper application of pressure and temperature has not been achieved, during either the heating or cooling cycle.

The polymer medium is also required to be substantially transparent to UV radiation at the elevated pressures that the polymer containing article precursor is molded. Substantially transparent as referred to in this application refers to sufficient transparency such that sufficient radiation is transmitted to cure the resin (e.g., activate a UV sensitive catalyst). Typically, this is at least about 10% but varies with many factors (e.g., polymer-media, UV source intensity, pressure, media purity, any entrained gases not removed by vacuum treatment, thickness of the part, etc.). Below about 10%, there is typically not enough intensity to cause curing within a reasonable time frame. It is especially preferred that the transmission is above about 33%. As stated below, UV radiation in particular refers to that portion of the spectrum that is required for the curing of the particular polymer being molded.

Figure 3:
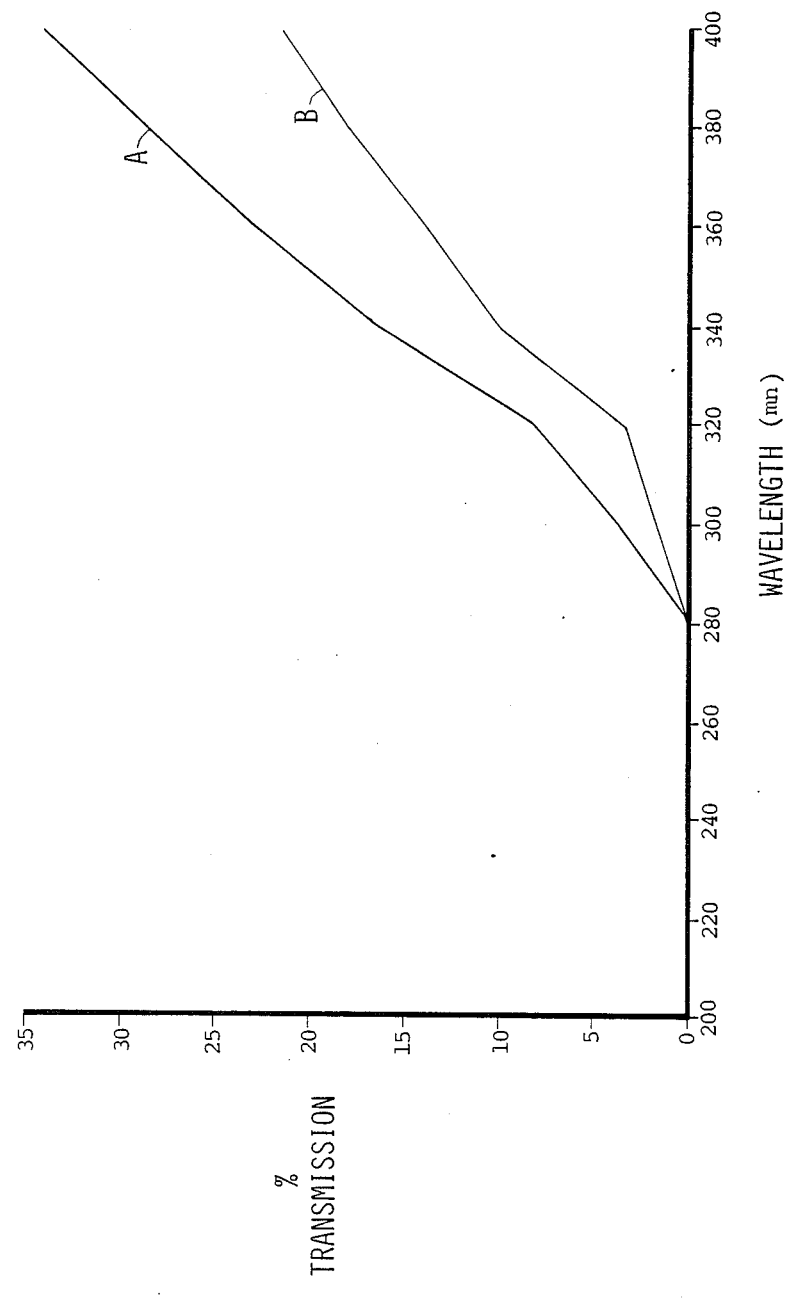
FIG. 3 illustrates a graph of UV transmission (%) vs. wavelength (nm) for two different unfilled silicone polymers placed under low pressures.

The ultraviolet radiation used in the practice of this invention corresponds to that needed to cure the particular polymer that is being molded. This is typically about 200 nm to about 400 nm in wavelength because above about 400 nm, insufficient energy is available to activate the catalyst (initiator) and below about 200 nm, the radiation is outside the range of absorption of conventional photoinitiators (catalysts). It is preferred that it is about 280 nm to about 400 nm since below about 280 nm little, if any, transmission has been observed for the above-described silicone polymers and above about 400 nm, there is little increase in percent transmission. FIG. 3 depicts two graphs of transmission (%) (y) vs. wavelength (nm) (x). Two polymers described earlier Dow Corning X5-8800(A) and X5-8023(B) were tested in a round cuvette. The cuvette was filled halfway with polymer and compacted with a round bolt (that fit snugly in the cuvette) at hand pressure. The hand pressure was released and the effective compacting pressure was substantially reduce. The cuvette was placed in the spectrophotometer and the scans in FIG. 3 were taken.

Generally, the radiation is maintained for under about 10 minutes and for larger throughput under about 10 seconds. However, the exposure time depends upon a variety of factors such as the transparency of the polymer medium, pressure vessel and polymer containing article, the thickness of the article, the type of polymer used in the article and the pressure employed. The elevated pressures referred to above are preferably above about 5 psi because below about 5 psi, the media has not coalesced sufficiently to allow transmission. It is especially preferred that the pressure is above about 20 psi as above that pressure, UV transmission is increased significantly.

The polymer has only been characterized according to the properties of some currently available materials; the data are insufficient to establish that the totality of measured properties in combination are necessary. On the contrary, to a significant extent, it is believed there is a redundancy and that they independently characterize the invention.

The pressure vessel used can be virtually anything that can provide support and/or structural support to the polymer medium and/or article. It is required that that portion of the vessel that the UV radiation must pass through to cure the article is substantially transparent to UV radiation, or at least that portion of the UV spectrum that provides the curing. The vessel need not be UV transparent if a UV source is disposed within the vessel in proximity to the article. When using transparent vessels, exemplary materials include quartz and acrylic pressure vessels. However, even transparent vacuum bags, when coupled with a tool (optionally in an autoclave) to provide support can work in the practice of this invention. In this embodiment, the polymer medium is placed above or between the article and the bag in an autoclave or the article is bagged and the polymer medium is placed outside the bag (vessel) and container in a second vessel (e.g., autoclave).

It is desirable that the vessel contain mainly the desired polymer medium and the article being molded. However, it will be appreciated that there will be allowed other objects, particles and materials to be contained within the medium. While the material is described as being essentially void-free during molding, such reference is to the absence of spaces between the individual pieces of the medium, and is not a limitation on such occasional voids as may be in the cast or formed polymer piece due to the nature of its manufacture.

The polymer containing article precursors of this invention are preferably composites and solid polymeric articles. These articles must contain a polymer or initiator that can be cured upon exposure to UV radiation. The preferable polymers will be those that are susceptible to in-depth UV curing. By in-depth is meant typically about 0.64 cm (0.25 inch) to typically about 7.62 cm (3.0 inch). In addition, the preferable polymers are those susceptible to UV fast cures. By UV fast cures is meant cures that take place in from less than about 1 second to about 2 to 3 minutes. Examples of these polymers include polyesters, vinyl esters, and silicones. The fibers used in composites typically detract from the UV transparent nature of the composite. However, for examples, some reflection will occur off of fiber surfaces and aid in-depth curing. Thus exemplary fibers such as quartz, glass and ceramic, etc. when incorporated in resins such as polymer, vinyl ester and silicone do not prohibit the curing. The thickness of the article as well as its composition will determine the UV radiation exposure time needed.

The present invention enables particularly good control over the pressure to which the article is subjected. Because the medium is solid, the article being molded need not be sealed in a manner which is impervious to gas or liquid, greatly alleviating problems with prior art methods such as bagging. The articles produced are considerably more uniform in properties, especially when of complex shape, compared to articles produced by the prior art method, for example. Because the medium is flowable and allows the mass contained within the pressure vessel to be varied during molding, the method surmounts problems associated with vacuum bagging requirements used in such things as autoclave and hydroclave techniques.

Finally, the UV transparent nature of the polymer medium eliminates the problem of opaque pressure vessels (e.g., vacuum bags) while facilitating the curing of thick structures under high pressures. Thus, this invention makes a significant advance in the field of molding particularly the field of fast care composite molding.

It should be understood that the invention is not limited to the particular embodiment shown and described herein, but that various changes and modifications may be made without departing from the spirit or scope of this concept as defined by the following claims.

I claim:
1. The method of pressure molding a polymeric containing article from a polymeric containing precursor article comprising
   (a) placing the precursor article within a pressure vessel;
   (b) substantially filling the vessel with a solid, flowable, polymer medium that is substantially ultraviolet transparent under pressure;
   (c) pressurizing said medium so as to produce a substantially uniform, predetermined pressure on the surface of said precursor article; and
   (d) passing through said pressurized medium ultraviolet radiation of about 280 nm to about 400 nm in wavelength sufficient to cure said article.
2. The method of forming a polymeric containing article as recited in claim 1 wherein said medium is pressurized from about 5 psi to about 200 psi.
3. The method of forming a polymeric containing article as recited in claim 1 wherein said medium comprises a solid, flowable, particulate silicone rubber having nominal flow rate of at least 0.6 gram/second through a 1.1 cm diameter pipe 7.5 cm long under applied pressure of 10.34 MPa at room temperature.
4. The method of forming a polymeric containing article as recited in claim 1 wherein said pressure vessel is substantially ultraviolet radiation transparent.
5. The method of forming a polymeric article as recited in claim 1 wherein the medium comprises dimethylsilicones.
6. The method of forming a polymeric containing article from a polymeric containing article precursor comprising:
   (a) substantially filling a pressure vessel with a solid flowable polymer medium that is substantially ultraviolet transparent under pressure;
   (b) pressurizing said medium so said medium is capable of producing a substantially uniform, predetermined pressure on the surface of said article; and
   (c) transferring said article precursor through said pressurized vessel while passing through said polymer medium ultraviolet radiation of about 280 nm to about 400 nm in wavelength sufficient to cure said article precursor.
7. The method of forming a polymeric containing article as recited in claim 6 wherein said medium is pressurized about about 5 psi to about 200 psi.
8. The method of forming a polymeric containing article as recited in claim 6 wherein said pressure chamber is substantially ultraviolet radiation transparent.
9. The method of forming a polymeric containing article as recited in claim 6 wherein said medium comprises a solid, flowable, particulate silicone rubber having a nominal flow rate of at least 0.6 gram/second through a 1.1 cm diameter pipe 7.5 cm long under applied pressure of 10.34 MPa at room temperature.

* * * * *

UNITED STATES PATENT AND TRADEMARK OFFICE
CERTIFICATE OF CORRECTION

PATENT NO.   : 4,879,073

DATED        : November 7, 1989

INVENTOR(S)  : Robert V. Kromrey

It is certified that error appears in the above-identified patent and that said Letters Patent is hereby corrected as shown below:

Col. 3, line 32, "201,355" should be --201,345--.

Col. 3, line 52, "f" should be --of--.

Signed and Sealed this

Twenty-second Day of January, 1991

Attest:

HARRY F. MANBECK, JR.

*Attesting Officer*   *Commissioner of Patents and Trademarks*